Figure 1:
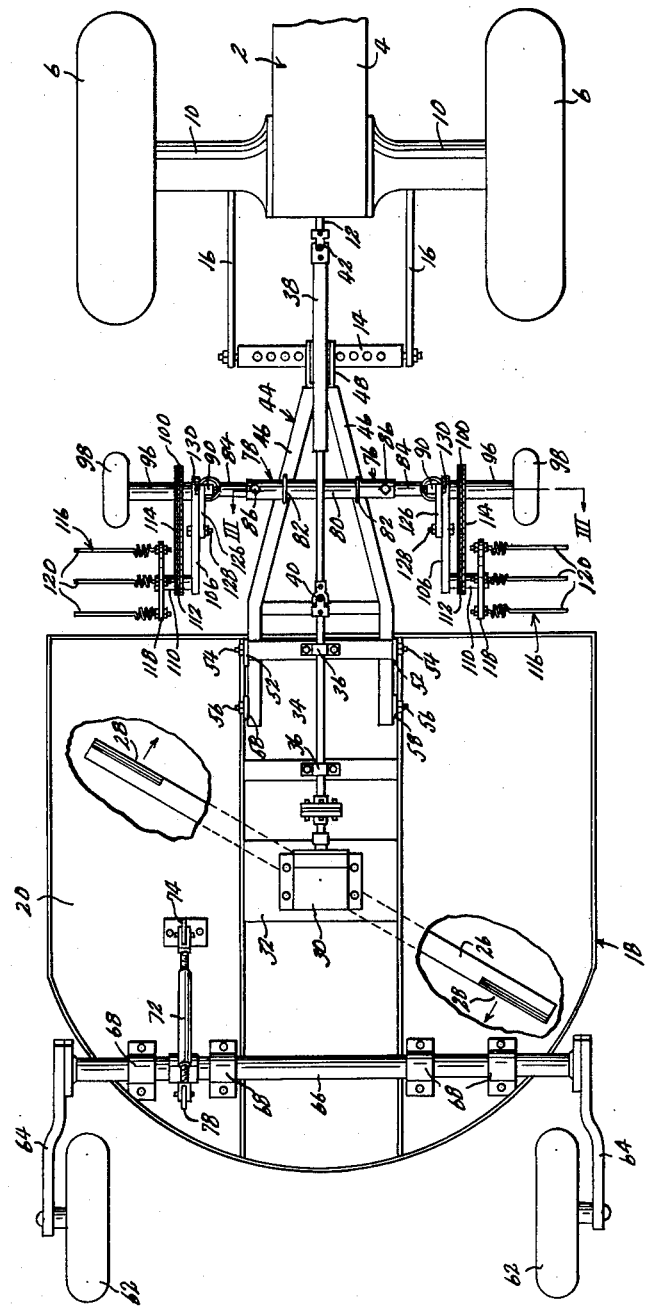

INVENTOR.
Frank Cowan
BY John A. Hamilton
Attorney.

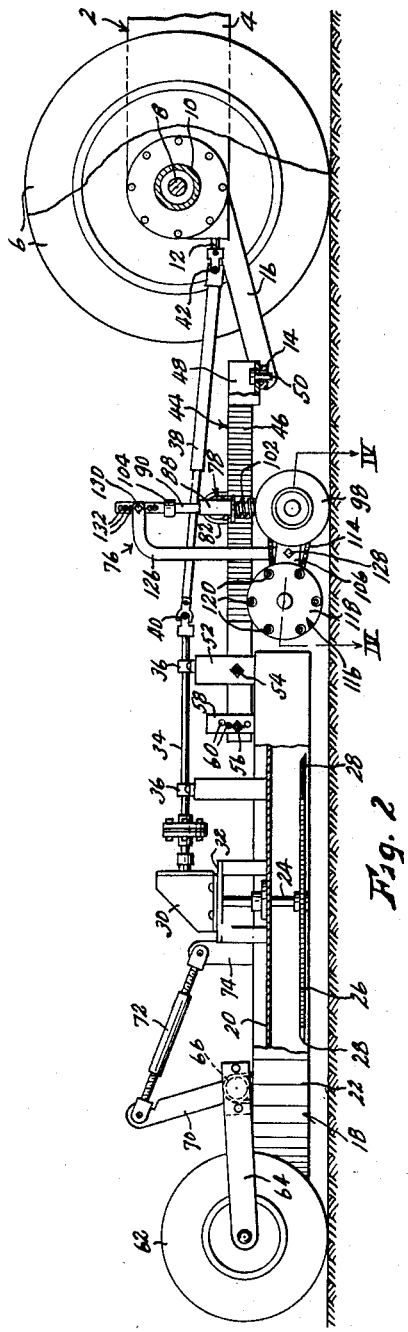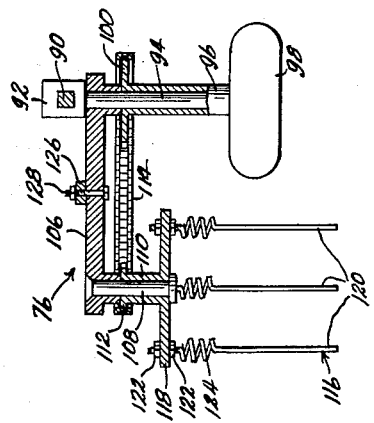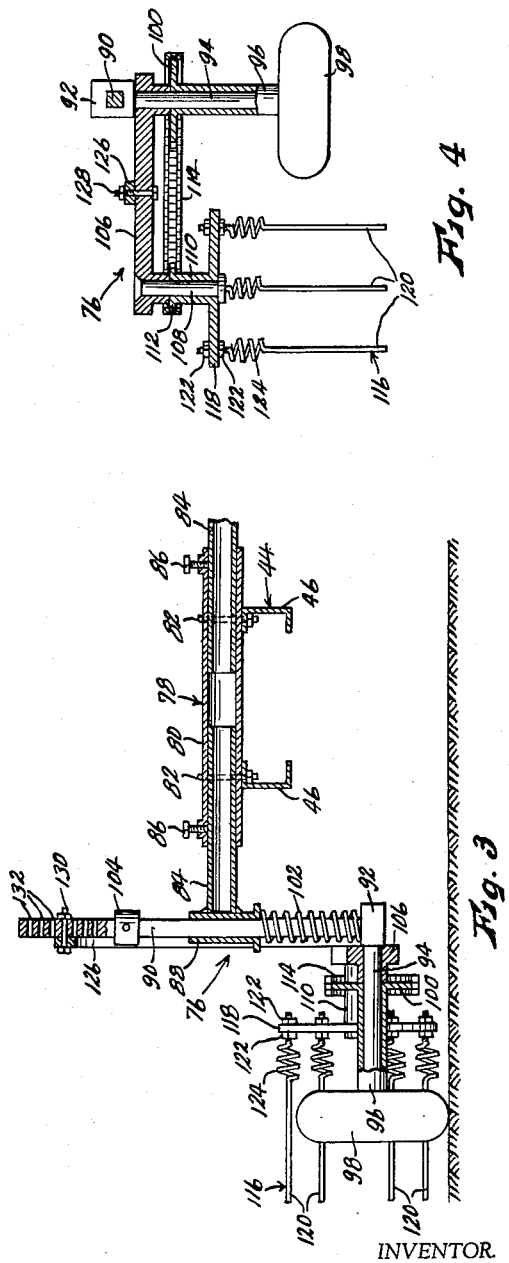

United States Patent Office 3,191,369
Patented June 29, 1965

3,191,369
WEED PICK-UP ATTACHMENT FOR MOWING MACHINES
Frank Cowan, Rte. 1, Golden City, Mo.
Filed Aug. 28, 1964, Ser. No. 392,753
10 Claims. (Cl. 56—25.4)

This invention relates to new and useful improvements in mowing machine apparatus, and has particular reference to a weed pick-up device for use in combination with farm mowing machines adapted to be towed behind farm tractors or the like.

Mowing machines adapted to be towed behind farm tractors are common and well known, especially for use in clearing fields and pastures of weeds, brush and the like. In the interests of efficiency and speed, it is also quite usual that such mowing machines cut a swath wider than the tractor itself. A common difficulty encountered with machines of this type is that the wheels of the tractor itself lay the weeds and brush in their paths down against the ground, so that they are disposed below the cutting level of the mowing machine blades and are not cut thereby. Perhaps hours or days later, a large percentage of the laid-down weeds will recover and become upright again, so that the mowed field is marred by lanes of uncut weeds marking the paths of the tractor wheels.

Accordingly, the primary object of the present invention is the provision of an attachment for mowing machines of this type which will pick-up and render generally upright the weeds and brush which have been beaten down by the tractor wheels, this operation being performed ahead of the mower blades, so that the picked-up vegetation will be cut by the blades.

Other objects are the provision of an attachment of the character described which may readily be used in connection with mowing machines of many different types, which requires no power connection either to the tractor or to the mowing machine, and in which the actual pick-up elements are vertically adjustable relative to the ground, whereby to accommodate the attachment to variable cutting heights of the mower blades, or to different types of vegetation.

With these objects in view, as well as other objects which will appear in the course of the specification, reference will be had to the accompanying drawing, wherein:

FIG. 1 is a top plan view of a mowing machine operatively connected to a farm tractor, shown fragmentarily, and having mounted thereon a pick-up attachment embodying the present invention, FIG. 2 is a side elevational view of the elements as shown in FIG. 1, with parts broken away and shown in section, FIG. 3 is an enlarged fragmentary sectional view taken on line III—III of FIG. 1, with parts left in elevation, and FIG. 4 is an enlarged fragmentary sectional view taken on line IV—IV of FIG. 2.

Like reference numerals apply to similar parts throughout the several views, and the numeral 2 applies generally to a farm tractor having a body 4 and the usual rear drive wheels 6 driven by a rear axle 8 supported in rear axle housings 10. Said tractor is also provided with a rear power take-off shaft 12 and a horizontal, transversely extending drawbar 14 supported rearwardly of axle housings 10 by a pair of links 16 joined to the tractor. Said links are fixed rigidly relative to the tractor by means not shown.

The numeral 18 applies generally to a mowing machine adapted to be towed behind tractor 2 and to cut a swath wider than the span of tractor wheels 6. While said mowing machine may be of many different types, it is shown by way of example as consisting of a horizontal platform 20 having a depending skirt 22 along the side and rearward edges thereof, and having a vertical shaft 24 journalled centrally therein. Below the platform the midpoint of a horizontal blade bar 26 is affixed to shaft 24, said bar having cutting edges 28 at its outer ends. Above platform 20, shaft 24 is connected to the output side of a right-angled gear drive 30 mounted on a pedestal 32 carried by platform 20. The input shaft 34 of said gear drive extends horizontally forwardly, being supported by bearings 36 carried by platform 20, to the forward edge of the platform. A telescopically extensible drive shaft 38 is connected at one end to the forward end of shaft 34 by universal joint 40, and at its opposite end to tractor power take-off shaft 12 by universal joint 42, whereby mower blade 26 is rotatably driven by the power plant of the tractor.

The forward end of platform 20 is connected to the tractor, and supported above the ground, by a tongue 44 consisting of a pair of channel-iron bars 46 which converge forwardly and are affixed at their forward ends to a hitch member 48 which is connected to tractor drawbar 14 by a removable hitch pin 50. Each bar 46 is pivoted adjacent its rearward end to a post 52 affixed to and extending upwardly from platform 20, by means of a bolt 54, said bolts being concentric on a horizontal transverse axis. Rearwardly of post 52, each bar 46 is affixed by a bolt 56 to a second post 58 extending upwardly from platform 20, said bolt being inserted selectively in any of a series of holes 60 formed in post 38. Thus tongue 44 may be pivoted vertically to vary the elevation of the forward edge of platform 20 above the ground, in turn to vary the cutting height of blade 26, and secured at the desired angle by bolts 56.

The rearward end of platform 20 is supported by a pair of ground-engaging wheels 62 disposed behind the platform and within the transverse limits of the swath cut by blade 26, and respectively at opposite sides of the platform. Each wheel 62 is journalled to the rearward end of a forwardly extending arm 64, the forward ends of said arms being affixed respectively to the opposite ends of a shaft 66 extending horizontally and transversely above the rearward portion of platform 20, said shaft being rotatably mounted in bearings 68 affixed to said platform. Affixed to said shaft is a radially extending arm 70, the outer end of said arm being connected by a turnbuckle 72 to a post 74 affixed to the platform. Thus by adjusting the turnbuckle, shaft 66 may be turned to raise or lower wheels 62 with respect to the platform, whereby the platform may be levelled regardless of the setting of tongue 44.

The weed pick-up attachment forming the central subject matter of the present invention is indicated generally by the numeral 76, and is mounted on tongue 44 of the mowing machine intermediate hitch 48 and the forward edge of platform 20. Said attachment includes a mounting member 78 consisting of a central tube 80 adapted to be laid horizontally and transversely across tongue bars 46 as shown, and to be affixed to said bars by U-bolts 82, and a pair of end tubes 84 telescoped slidably in said central tube and extending outwardly respectively from the opposite ends thereof. Each tube 84 is adjustably fixable in tube 80 by a set screw 86. At the outer extended end of each tube 84 is affixed a vertical sleeve 88 in which a vertical square post 90 is slidably mounted, said post extending both above and below said sleeve.

Affixed to the lower end of post 90 is a block 92 (see FIGS. 3 and 4), and affixed in said block is a horizontally extending stub shaft 94, said stub shaft being parallel to mounting member 68 and extending outwardly therefrom. Rotatably mounted on the stub shaft is a tubular sleeve 96. Fixed concentrically on the outer end of sleeve 96 is a ground-engaging drive wheel 98, and a sprocket wheel 100 is formed integrally with or affixed to the inner end of said sleeve. Wheel 98 is urged firmly against the ground, so as to be rotatably driven by its engagement therewith, by a helical compression spring 102 coiled about post 90, said spring bearing at its upper end against sleeve 88 and at its lower end against block 92. Downward movement of post 90 is limited by a collar 104 secured thereon in spaced relation above sleeve 88.

Also pivoted on stub shaft 94 is one end of a rigid radius arm 106, said arm extending generally rearwardly and having affixed in the rearward end thereof a stub shaft 108 (see FIG. 4), which is parallel to shaft 94. Rotatably mounted on stub shaft 108 is a sleeve 110 having a sprocket wheel 112 formed integrally therewith, said last named sprocket wheel being operatively interconnected with sprocket wheel 100 by a drive chain 114. Also carried by sleeve 110 is a squirrel cage reel 116. Said reel consists of a planar disc 118 affixed concentrically to sleeve 110 and a plurality of spring fingers 120 affixed in the edge portion of said disc at regularly spaced angular intervals and extending outwardly therefrom in a direction parallel to the reel axis. As best shown in FIGS. 3 and 4, each finger 120 consists of a thin rod of spring steel affixed in disc 118 by a pair of nuts 122 threaded thereon respectively at opposite sides of said disc. The flexibility of each finger is increased by the forming of a portion thereof adjacent disc 118 into a helical coil 124. The vertical plane of each drive wheel 98 intersects fingers 120 approximately midway between disc 118 and the free ends of said fingers. The length of fingers 120 is at least equal to the thickness of a tractor drive wheel 6, in a direction parallel to the axis thereof.

An angled brace arm 126 supports radius arm 106 rigidly but adjustably against pivotal movement around stub shaft 94. The lower end of said brace arm is secured pivotally to radius arm 106 intermediate its ends by a bolt 128, and the upper end of said brace arm is secured to post 90 above collar 104 by a bolt 130 inserted selectively in any one of a series of vertically spaced apart holes 132 formed in post 90. By selecting the proper hole, radius arm 106 is pivoted on stub shaft 94 to position reel 116 at the desired elevation above the ground.

In mounting the pick-up attachment, the only adaptation of the mowing machine which need be performed is the drilling of holes in the tongue bars 46 for receiving U-bolts 82 to secure the attachment mounting member 78 to said tongue. Since said U-bolts may engage any portion of mounting member tube 80, it will be apparent that the attachment may be joined to tongues of many different styles and shapes. Then, after loosening set screws 86, mounting member tubes 84 are slid inwardly or outwardly in tube 80 until attachment drive wheels 98 are disposed respectively directly behind tractor drive wheels 6, as shown in FIG. 1. Drive wheels 98 thus traverse only ground on which the vegetation has already been laid down by the tractor wheels, and do not themselves leave trails of laid-down vegetation. The spring fingers 120 of each reel 116 then span transversely the trail of laid-down vegetation left by one of tractor wheels 6. Drive wheels 98 are of course urged firmly against the ground by springs 102, so that as the mowing machine moves forwardly, drive wheels 98 are rotated by their contact with the ground, and operate through drive chains 114 to rotate reels 116 in the same direction. However, since sprocket wheels 100 are larger than sprocket wheels 112, reels 116 turn faster than wheels 98, and have a greater peripheral speed since wheels 98 and reels 116 have about the same diameters. Therefore the lower spring fingers 120 of the reels have a rearward "sweeping" motion with respect to the ground, and they therefore engage and tend to move to an upright position the weeds, brush and other vegetation which has previously been laid down forwardly by the passage of tractor wheels 6 thereover, so that said vegetation will then be properly cut by mower blade 26. For example, if as shown the sprocket wheels 100 and 112 have a 2 to 1 ratio, then reels 116 will turn at twice the speed of wheels 98, and the lower fingers 120 of the reels will sweep rearwardly with respect to the ground at about the same speed as the tractor and mowing machine are moving forwardly. This relationship has been found quite satisfactory, though obviously other ratios could be used if desired. Also, it will be understood also that sprocket chains 114 and sprocket wheels 100 and 112 are enclosed in sheet metal housings to prevent vegetation from becoming fouled therein, though these housings have been omitted from the drawings in the interests of clarity.

Reel fingers 120 must be of sufficient rigidity to perform their pick-up function efficiently, but should also be yieldable to prevent their becoming inextricably entangled in weeds and the like. The helically wound portion 124 of each finger is useful in this respect in that if the fingers should become fouled by weeds, the helical portion permits each finger to be flexed rearwardly to lie parallel to the direction of travel, so as to be pulled longitudinally free of the weed tangle by forward motion of the tractor.

The elevation of reels 116 above the ground, which may be adjusted by means of brace arms 126 as previously described, should of course be such that the lowermost fingers thereof are closer to the ground than the cutting height for which mower blade 26 has been set, and further said fingers should sweep as close to the ground as is practically possible without actually touching it, in order to pick up the greatest possible percentage of the vegetation. On level ground there is no problem, and the reels may be set very close to the ground. Even on rough ground, the problem is largely solved by the fact that drive wheels 98 are disposed immediately adjacent the reels, and will follow undulations of the ground surface, and of course will cause the reels to follow said undulations as well. On extremely rough terrain, where changes of elevation may be very sharp and rapid, it may be necessary to set the reels somewhat higher to avoid actual contact thereof with the ground.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. For use in connection with a mowing machine adapted to be towed behind a wheeled vehicle and operable to cut a swath wider than the transverse wheel span of said towing vehicle, a weed pick-up attachment comprising:
   (a) a mounting member adapted to be affixed to said mowing machine forwardly of the cutter elements thereof and rearwardly of said towing vehicle,
   (b) a pair of ground-engaging drive wheels carried rotatably by said mounting member and adapted to engage the ground respectively directly behind the rear wheels of said towing vehicle, and to be rotated by virtue of said engagement as said mowing machine is towed forwardly,
   (c) a pair of weed pick-up reels disposed respectively directly behind each of said drive wheels and carried by said mounting member for rotation about an axis parallel to the axis of said wheel, said reel being disposed slightly higher than said drive wheel whereby to clear the ground, and
   (d) drive means interconnecting each of said drive wheels with its associated pick-up reel, whereby the latter is driven by the former.

2. A weed pick-up attachment as recited in claim 1 wherein said mounting member includes means for adjusting the spacing between said drive wheels, whereby said drive wheels may be positioned directly behind the rear wheels of the towing vehicle regardless of variation in the spacing of said latter wheels.

3. A weed pick-up attachment as recited in claim 1 wherein said mounting member includes means for urging said drive wheels yieldably downwardly against the ground, whereby to provide good traction for turning said drive wheels, and whereby said drive wheels are yieldable upwardly to follow undulations of the ground surface.

4. A weed pick-up attachment as recited in claim 3 wherein the reel associated with each of said drive wheels is carried rotatably by a support member normally rigidly related to the axis of said drive wheel, whereby said reel moves vertically with said drive wheel.

5. A weed pick-up attachment as recited in claim 1 with the addition of means for adjusting the vertical elevation of each of said reels relative to its associated drive wheel.

6. A weed pick-up attachment as recited in claim 1 wherein each of said pick-up reels comprises a generally planar disc mounted for rotation about its axis and a series of resilient fingers fixed in the edge portion of said disc in angularly spaced relation and extending outwardly from said disc in a direction parallel to the axis thereof, the vertical plane of said drive wheel intersecting the extended portions of said fingers.

7. A weed pick-up attachment as recited in claim 6 wherein said drive means is operable to turn each of said reels in the same direction as but at a greater peripheral speed than its associated drive wheel, whereby the lowermost fingers of said reel move rearwardly relative to the mowing machine at a speed greater than the forward speed of said mowing machine relative to the ground.

8. A weed pick-up attachment as recited in claim 6 wherein each of said fingers constitutes a length of spring rod having one end thereof affixed in said disc, and having a portion thereof immediately adjacent said disc formed in a helical coil.

9. A weed pick-up attachment as recited in claim 1 wherein said mounting member constitutes a central tube adapted to be affixed to said mowing machine so as to extend horizontally and transversely to its direction of travel, a pair of end tubes telescoped slidably in the respective end portions of said central tube and extending outwardly therefrom, means for adjustably fixing said end tubes in said central tube, a vertical sleeve affixed to the outer end of each of said end tubes, a vertical post carried for vertical sliding movement in each of said sleeves, a stub shaft affixed to and extending horizontally from the lower end of each of said posts, one of said drive wheels being rotatably mounted on the free end portion of each of said stub shafts, resilient means urging each of said posts downwardly in its sleeve whereby to urge the associated drive wheel against the ground, a radius arm pivoted on each of said stub shafts and extending generally rearwardly therefrom, a second stub shaft fixed in the rearward end of each of said radius arms and extending parallel to the first named stub shaft, one of said pick-up reels being rotatably mounted on each of said second stub shafts, and means for adjustably pivoting each of said radius arms on said first named stub shaft whereby to adjust the elevation of the associated reel above the ground, and wherein said drive means constitutes a pair of sprocket wheels respectively fixed relative to said drive wheel and said reel, and a sprocket chain interconnecting said sprocket wheels, the ratio of said sprocket wheels being such that said reel rotates with a greater peripheral speed than said drive wheel.

10. A weed pick-up attachment as recited in claim 9 wherein each of said reels constitutes a generally planar disc mounted for rotation about its axis and a plurality of resilient fingers affixed in the edge portion of said disc in angularly spaced relation and extending outwardly therefrom in parallel relation to the axis thereof, the plane of the associated drive wheel intersecting said fingers substantially midway between their ends.

References Cited by the Examiner
UNITED STATES PATENTS

| 1,538,381 | 5/25 | Bull | 56—251 |
| 2,209,309 | 7/40 | George | 56—26 |

FOREIGN PATENTS

| 730,658 | 5/55 | Great Britain. |

ANTONIO F. GUIDA, *Acting Primary Examiner.*